US011924305B2

(12) United States Patent
Li et al.

(10) Patent No.: US 11,924,305 B2
(45) Date of Patent: Mar. 5, 2024

(54) EDGE NODE AUTONOMY

(71) Applicant: International Business Machines Corporation, Armonk, NY (US)

(72) Inventors: Peng Li, Xian (CN); Guang Ya Liu, Cary, NC (US); Xun Pan, Xian (CN); Hai Hui Wang, Xian (CN); Xiang Zhen Gan, Xian (CN)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 17/809,597

(22) Filed: Jun. 29, 2022

(65) Prior Publication Data

US 2024/0007547 A1     Jan. 4, 2024

(51) Int. Cl.
*H04L 67/60* (2022.01)
*H04L 41/12* (2022.01)
*H04L 67/566* (2022.01)

(52) U.S. Cl.
CPC ............ *H04L 67/60* (2022.05); *H04L 41/12* (2013.01); *H04L 67/566* (2022.05)

(58) Field of Classification Search
CPC ........ H04L 67/60; H04L 67/566; H04L 41/12
See application file for complete search history.

(56) References Cited

U.S. PATENT DOCUMENTS

| 11,201,794 B1 * | 12/2021 | Guo | H04L 43/0864 |
| 11,767,274 B1 * | 9/2023 | Merrill | C07C 1/0495 |
| | | | 585/240 |
| 2013/0198386 A1 * | 8/2013 | Srikanth | G06F 9/5061 |
| | | | 709/226 |
| 2014/0092773 A1 | 4/2014 | Lu | |
| 2016/0094650 A1 * | 3/2016 | Garcia de Rio | H04L 47/78 |
| | | | 709/226 |
| 2017/0010874 A1 * | 1/2017 | Rosset | H04L 41/082 |

(Continued)

FOREIGN PATENT DOCUMENTS

| CN | 112035215 A | 12/2020 |
| CN | 112910981 A | 6/2021 |

(Continued)

OTHER PUBLICATIONS

"Kubernetes Native Edge Computing Framework", KubeEdge, Oct. 28, 2021, 24 pages, <https://golangrepo.com/repo/kubeedge-kubeedge>.

(Continued)

*Primary Examiner* — Dhairya A Patel
(74) *Attorney, Agent, or Firm* — Edward P. Li

(57) ABSTRACT

A computer-implemented method, an apparatus, and a computer program product for edge node autonomy. For a first edge node of a plurality of edge nodes in a federation in a distributed computing framework, one or more processors receive a request to be sent to a central node in the distributed computing framework. The one or more processors determine whether the federation is connected to the central node. In response to determining that the federation is not connected to the central node, the one or more processors determine whether a controller capable of processing the request is available in the federation. In response to determining that the controller capable of processing the request is available in the federation, the one or more processors notify the controller to process the request.

20 Claims, 9 Drawing Sheets

(56) References Cited

U.S. PATENT DOCUMENTS

| | | | | |
|---|---|---|---|---|
| 2019/0163173 | A1* | 5/2019 | Goldschmidt | H04L 63/00 |
| 2020/0084202 | A1* | 3/2020 | Smith | H04W 12/08 |
| 2020/0287974 | A1* | 9/2020 | Gnessin | H04L 63/0876 |
| 2020/0402065 | A1* | 12/2020 | Kapur | G06Q 20/3278 |
| 2021/0314388 | A1* | 10/2021 | Zhou | H04L 41/0895 |
| 2022/0342899 | A1* | 10/2022 | Harwood | G06F 9/505 |
| 2023/0008892 | A1* | 1/2023 | M M | H04W 48/18 |
| 2023/0289228 | A1* | 9/2023 | Chintha | G06F 9/5061 |
| 2024/0015100 | * | 1/2024 | Jain | H04L 45/48 |

FOREIGN PATENT DOCUMENTS

| | | |
|---|---|---|
| CN | 113596916 A | 11/2021 |
| CN | 113946408 A | 1/2022 |
| WO | 2022125456 W | 6/2022 |

OTHER PUBLICATIONS

"Understand the architecture and principle of superedge edge container", chowdera.com, Jan. 17, 2021, 8 pages, <https://chowdera.com/2021/01/20210117150048307p.html>.

"View SuperEdge edge node autonomy from lite-apiserver", By Tencent Cloud Native, Apr. 7, 2021, 6 pages, <https://cdmana.com/2021/04/20210407184411093u.html>.

Cao et al., "Edge Federation: Towards an Integrated Service Provisioning Model", arXiv:1902.09055v3, [cs.NI] Mar. 27, 2020, 14 pages.

Chandra, Gokul, "SuperEdge, OpenYurt—Extending Native Kubernetes to Edge", Itnext, Feb. 4, 2021, 41 pages, <https://itnext.io/superedge-openyurt-extending-native-kubernetes-to-edge-cc59094f92c>.

Chandra, Gokul, "Virtual Kubelet and Managing IoT Edge Devices with Azure Kubernetes Service (AKS)", Itnext, Jun. 3, 2022, 20 pages, <https://itnext.io/virtual-kubelet-and-managing-iot-edge-devices-with-azure-kubernetes-service-aks-97ad531e5ad8>.

Kubeedge Maintainers, "HarmonyCloud promotes edge computing implementation", Cloud Native Computing Foundation, Aug. 31, 2021, 9 pages, <https://www.cncf.io/blog/2021/08/31/harmonycloud-promotes-edge-computing-implementation/>.

Mell et al., "The NIST Definition of Cloud Computing", NIST National Institute of Standards and Technology U.S. Department of Commerce, Special Publication 800-145, Sep. 2011, 7 pages.

Xiong et al., "Extend Cloud to Edge with KubeEdge", 2018 Third ACM/IEEE Symposium on Edge Computing, 5 pages.

"Patent Cooperation Treaty PCT Notification of Transmittal of the International Search Report and the Written Opinion of the International Searching Authority, or the Declaration", Applicant's file reference EIE230285PCT, International application No. PCT/CN2023/088928, International filing date Apr. 18, 2023, dated Jun. 21, 2023, 7 pages.

* cited by examiner

EDGE NODE AUTONOMY

BACKGROUND

The present invention relates generally to edge computing, and more particularly to edge node autonomy.

Edge computing involves a distributed computing framework that brings enterprise applications closer to data sources such as Internet of Things (IoT) devices or local edge servers. This proximity to data at its source can deliver strong business benefits: faster insights, improved response times, and better bandwidth availability.

Generally, the distributed computing framework may comprise a central node and a plurality of edge nodes. Each of the edge nodes may be interacted with the central node through a network connection to access data from the central node. As a result, the edge node may manage local containers on the edge node based on the accessed data. However, in a weak network environment, the edge node may be disconnected from the central node, such that local containers cannot work normally.

Patent application US20200402065A1 (Kapur, 2020) discloses a federated edge-node computing system which allows customers to work in offline mode (e.g., during a disaster). In patent publication CN112035215A (Zhang, 2020), the disclosure provides a node autonomous method, through which the disaster tolerance capability of the slave nodes can be improved, and the edge autonomy of the software container is realized. In patent publication CN113946408A (Zhu, 2022), the disclosure provides a cloud native edge container control method; under the condition that the edge container is disconnected in the network, the method has the edge autonomous function of maintaining the stability of the edge service. Patent publication CN112910981A (Wu, 2022) discloses a control method and a control device, by which the hosting edge node establishes communication connection with the offline edge node. However, none of the references discloses about federation autonomy for edge nodes.

SUMMARY

In one aspect, a computer-implemented method for edge node autonomy is provided. The method includes, for a first edge node of a plurality of edge nodes in a federation in a distributed computing framework, receiving, by one or more processors, a request to be sent to a central node in the distributed computing framework. The method further includes determining, by the one or more processors, whether the federation is connected to the central node. The method further includes, in response to determining that the federation is not connected to the central node, determining, by the one or more processors, whether a controller capable of processing the request is available in the federation. The method further includes, in response to determining that the controller capable of processing the request is available in the federation, notifying, by the one or more processors, the controller to process the request.

In the computer-implemented method, a plurality of customer resource definitions are installed in the first edge node, each of the plurality of controller resource definitions is associated with a controller arranged in the federation. For determining whether the controller capable of processing the request is available in the federation, the method further includes: identifying, by the one or more processors, a controller resource definition which is modified according to the request; determining, by the one or more processors, whether the controller resource definition is contained in the plurality of the customer resource definitions; and, in response to determining that the controller resource definition is contained in the plurality of the customer resource definitions, determining, by the one or more processors, that the controller capable of processing the request is available in the federation. For determining the controller in the federation, the method further includes determining, by the one or more processors, a controller associated with the controller resource definition as the controller capable of processing the request.

In the computer-implemented method, the first edge node comprises a message queuing telemetry transport (MQTT) module. The method further includes: during a disconnection period in which the federation is not connected to the central node, receiving, by the one or more processors, a plurality of requests in sequence; pushing, by the one or more processors, the plurality of the requests into the MQTT module in sequence; in response to a reconnection between the federation and the central node after the disconnection period, sending, by the one or more processors, the plurality of the requests in the MQTT module to the central node in sequence.

In the computer-implemented method, the first edge node is connected to the central node via a network connection, and each of other edge nodes in the federation is configured with configuration data of the first edge node. In the method, a second edge node is joined into the federation by: sending a joining request to the central node, receiving from the central node a list of edge nodes connected to the central node, selecting one of the edge nodes from the list, and resetting configuration data with configuration data of the one of the edge nodes, such that the second edge node is joined into the federation comprising the one of the edge nodes.

The method further includes determining, by the one or more processors, whether the first edge node is connected to the central node. The method further includes, in response to determining that the first edge node is not connected to the central node, determining, by the one or more processors, whether there are one or more edge nodes capable of connecting to the central node in the federation. The method further includes, in response to determining that there are the one or more edge nodes capable of connecting to the central node in the federation, causing, by the one or more processors, one of the one or more edge nodes to connect to the central node such that the federation is connected to the central node. In the method, data stored in the first edge node are synchronized to the one of the one or more edge nodes.

In another aspect, an apparatus for edge node autonomy is provided. The apparatus comprises one or more processors, one or more computer readable tangible storage devices, and program instructions stored on at least one of the one or more computer readable tangible storage devices for execution by at least one of the one or more processors. The program instructions are executable to: for a first edge node of a plurality of edge nodes in a federation in a distributed computing framework, receive a request to be sent to a central node in the distributed computing framework; determine whether the federation is connected to the central node; in response to determining that the federation is not connected to the central node, determine whether a controller capable of processing the request is available in the federation; and in response to determining that the controller capable of processing the request is available in the federation, notify the controller to process the request.

In yet another aspect, a computer program product for edge node autonomy is provided. The computer program product comprises a computer readable storage medium having program instructions embodied therewith, and the program instructions are executable by one or more processors. The program instructions are executable to, for a first edge node of a plurality of edge nodes in a federation in a distributed computing framework, receive a request to be sent to a central node in the distributed computing framework. The program instructions are further executable to determine whether the federation is connected to the central node. The program instructions are further executable to, in response to determining that the federation is not connected to the central node, determine whether a controller capable of processing the request is available in the federation. The program instructions are further executable to, in response to determining that the controller capable of processing the request is available in the federation, notify the controller to process the request.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
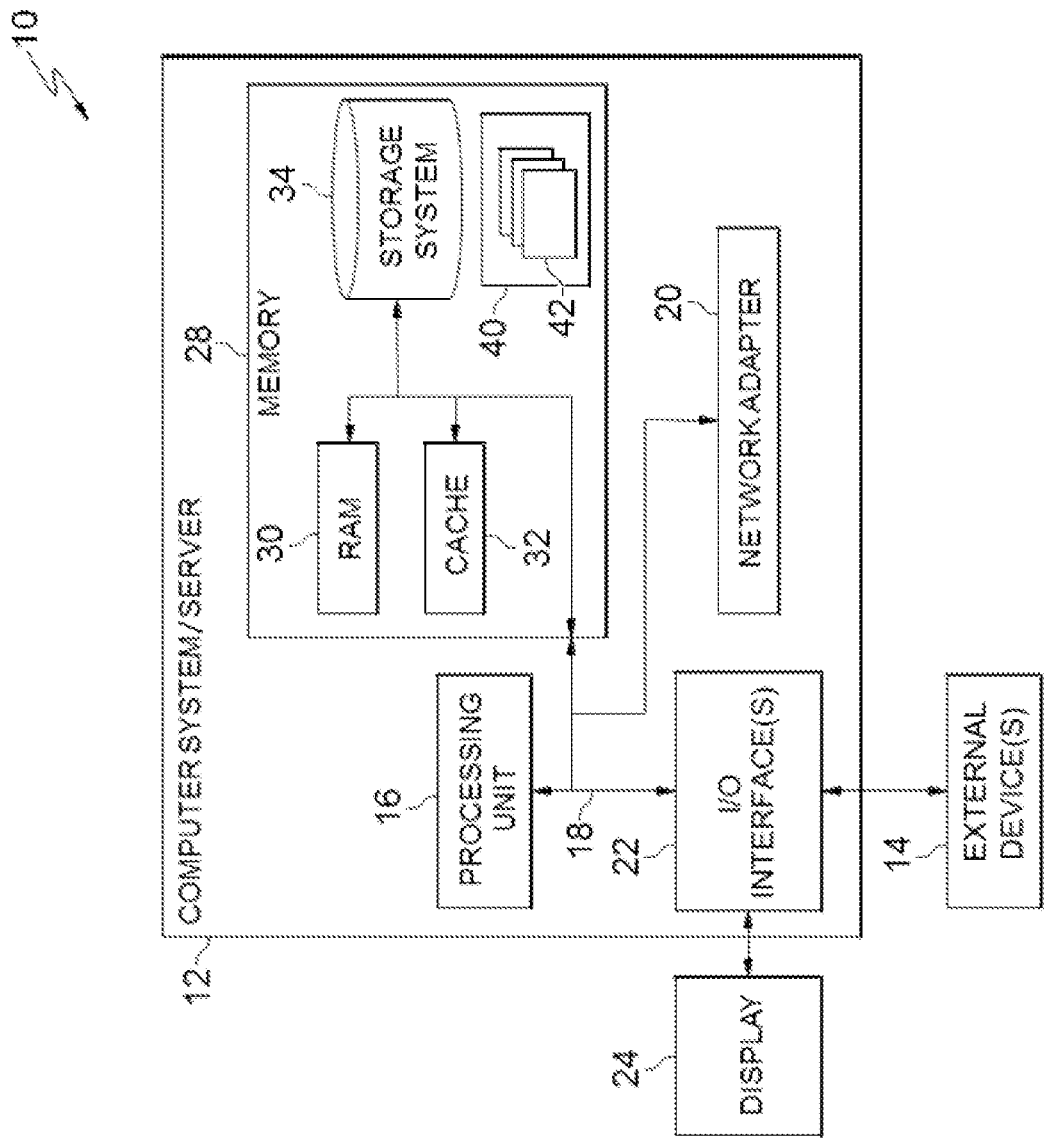
FIG. 1 depicts a cloud computing node, in accordance with one embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
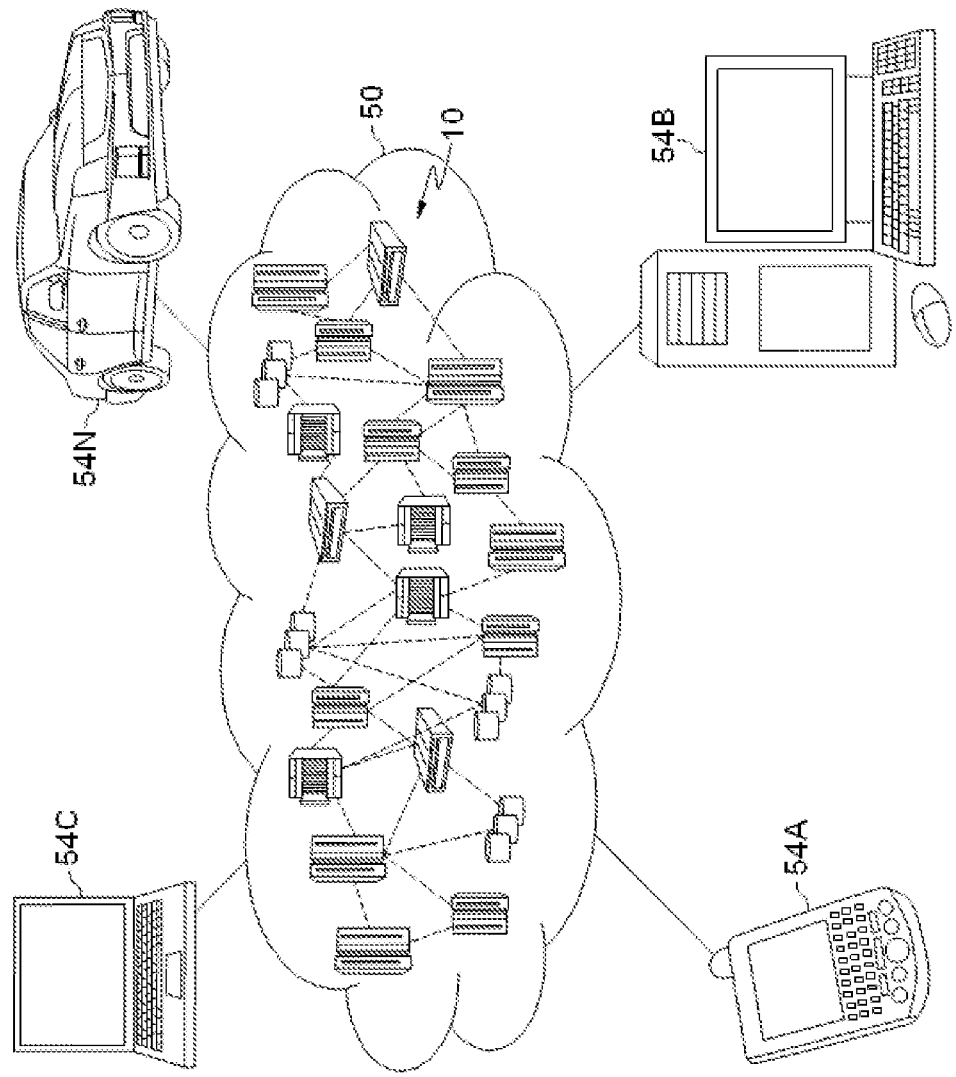
FIG. 2 depicts a cloud computing environment, in accordance with one embodiment of the present invention.

Referring now to FIG. 2, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 3:
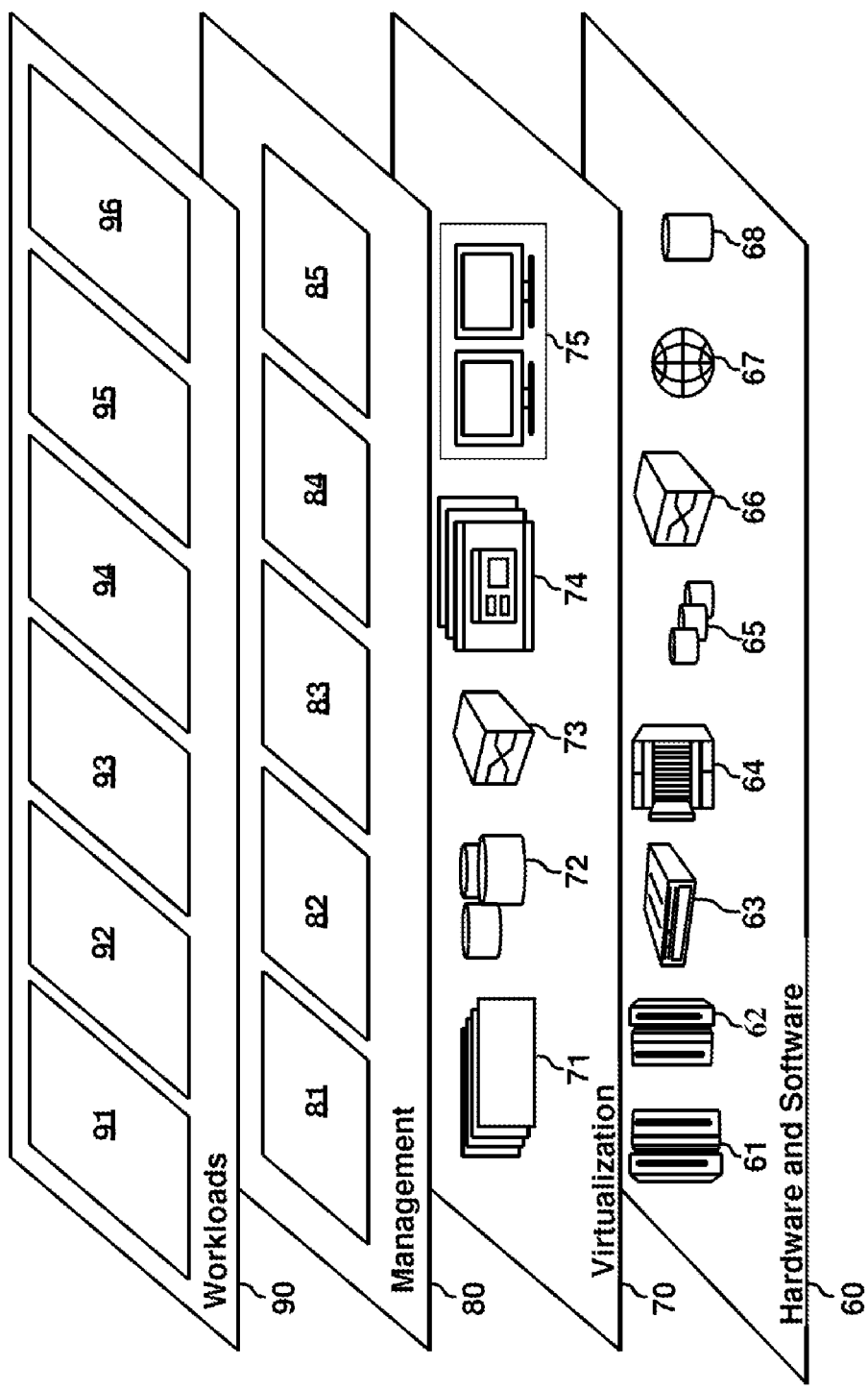
FIG. 3 depicts abstraction model layers in a cloud computing environment, in accordance with one embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and edge node autonomy 96.

In a distributed computing frame, if an edge node is under a weak network environment, it may be disconnected from the central node. In such circumstances, an autonomy method for the edge node may be implemented, such that local containers on the edge node can still work normally. Thus, the edge node may become an autonomy area. However, resources on the autonomy area may be limited.

In some embodiments of the present disclosure, two or more edge nodes may be connected together to form an autonomy federation. Compared with the autonomy area described above, the autonomy federation may be more robust, as more resources may be employed by the respective edge nodes. The autonomy federation may be described below in connection with a distributed computing frame according to embodiments of the present disclosure.

Figure 4:
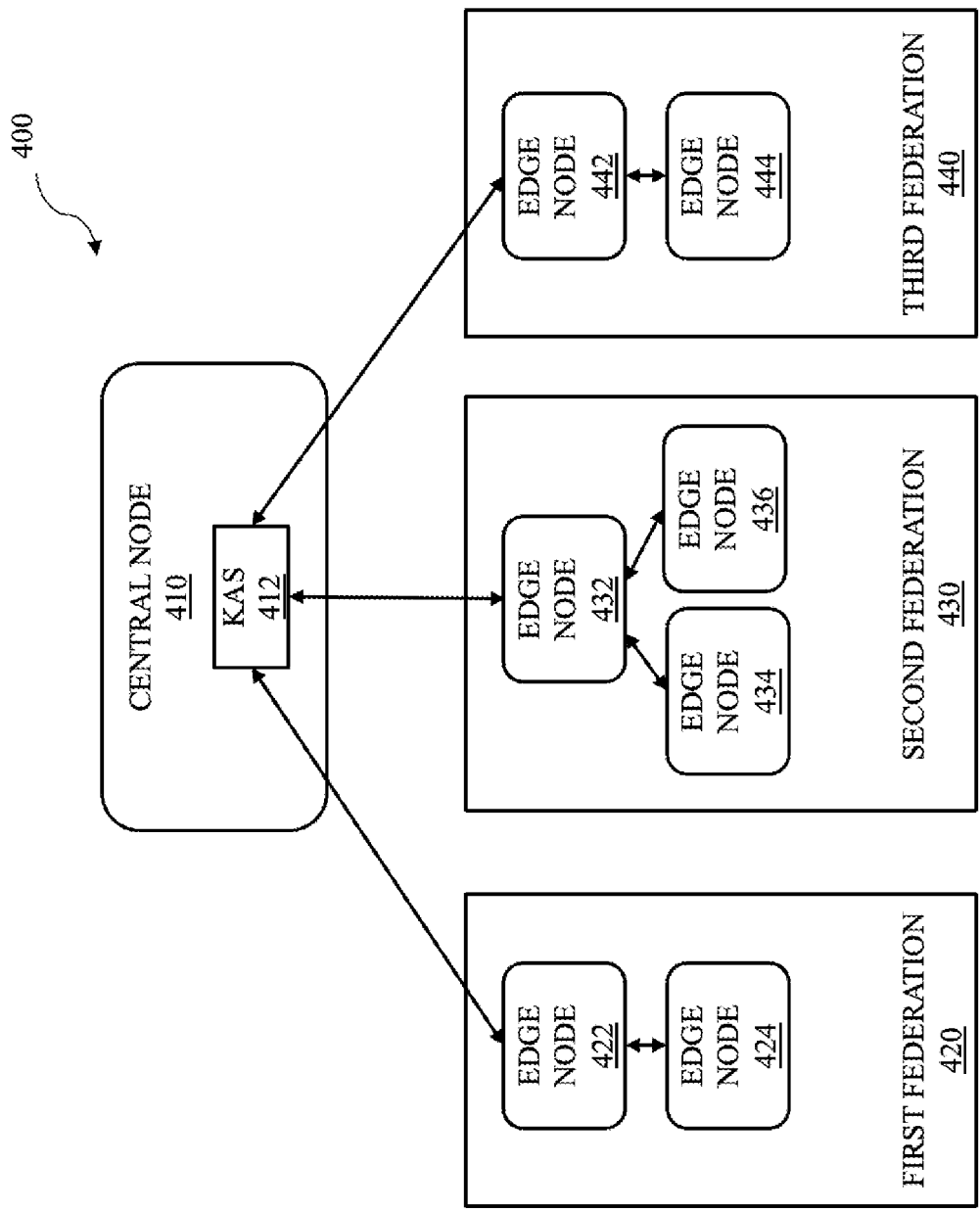
FIG. 4 depicts a schematic block diagram of a distributed computing framework, in accordance with one embodiment of the present invention.

FIG. 4 depicts a schematic block diagram of a distributed computing framework 400 according to embodiments of the present disclosure.

As shown in FIG. 4, the distributed computing framework 400 comprises a central node 410 and a plurality of federations, such as a first federation 420, a second federation 430, a third federation 440, and/or the like. For example, the first federation 420 may comprise the edge node 422 and edge node 424. The second federation 430 may comprise edge node 432, edge node 434, and edge node 436. The third federation 440 may comprise edge node 442 and edge node 444. It can be noted that, the number of edge nodes in each federation may be varied based on actual needs, and not be limited herein.

In some embodiments, the central node 410 may be a cloud computing node, for example, the cloud computing node 10 shown in FIG. 1. Moreover, the central node 410 may be provided with an Application Programming Interface (API) server, for example, a Kubernetes API server (KAS) 412. The KAS 412 may be a hub for data interaction and communication in the distributed computing framework 400. Thus, the respective federations may interact with the KAS 412 to access data in the central node.

The respective federations may comprise a number of edge nodes. In some embodiments, the edge nodes may be federated based on certain rules. For example, in each federation, the edge nodes may be located in a predetermined region (or zone). Moreover, the edge nodes may also be arranged in the same federation based on user preference.

Typically, within the federation, the respective edge nodes may be connected under a same local area network. Thus, the respective edge nodes may communicate to each other via an internal network. In some embodiments, each of the edge nodes may be a local computing device, and for example, may be implemented with the computer system/server 12 shown in FIG. 1.

In some embodiments, the edge nodes in each federation may be configured with a role, for example, a main or a sub. Specifically, there may be only one master edge node (also can be referred to as a first edge node), and other edge nodes besides the main edge node may be sub edge nodes (also can be referred to as second edge nodes). The main edge node (for example, the edge node 422, edge node 432, and edge node 442) may be connected to the central node 410 directly via a network connection, for example, via a public network. In some embodiments, the main edge node may be provided with a proxy. The proxy may be implemented with a lite KAS, which may be used to communicate to the KAS 412.

Specific details for the lite KAS may be described hereinafter, for example, with respect to a lite KAS 5102 in FIG. 5.

Generally, the sub edge nodes may not be connected to the central node directly, though some of them may have the ability to connect to the central node. In some embodiments, the sub edge nodes (for example, the edge node 424, edge node 434, edge node 436, and edge node 444) may be communicated with the main edge node, for example, through internal networks. Then, the respective sub edge node may access to the proxy (e.g., the lite KAS) of the main edge node in the federation, and communicate with the central node 410 via the proxy of the main edge node.

As some of the sub edge nodes may have the ability to connect with the central node, the federation may employ such sub edge node to connect to the central node, if the main edge node is disconnected to the central node. It can be noted that, the disconnection may indicate that the network therebetween is unstable or completely broken. In some embodiments, the role of the edge nodes may be changed. For example, one of the sub edge nodes capable of connecting to the central node may be switched to the main edge node, while the original main edge node may be switched to the sub edge node. In this way, the network between the federation (i.e., the new main edge node) and the central node may be maintained, thereby improving the robustness of the federation. Meanwhile, the autonomy may not occur. Detail descriptions will be described hereinafter.

In some embodiments, the edge node which firstly existed in the federation may be configured as the main edge node. It can be understood that the main edge node may also be determined based on other strategies, for example, network signal strength.

It can be understood that, the central node 410 may also be connected to an individual edge node, besides the federations.

Figure 5:
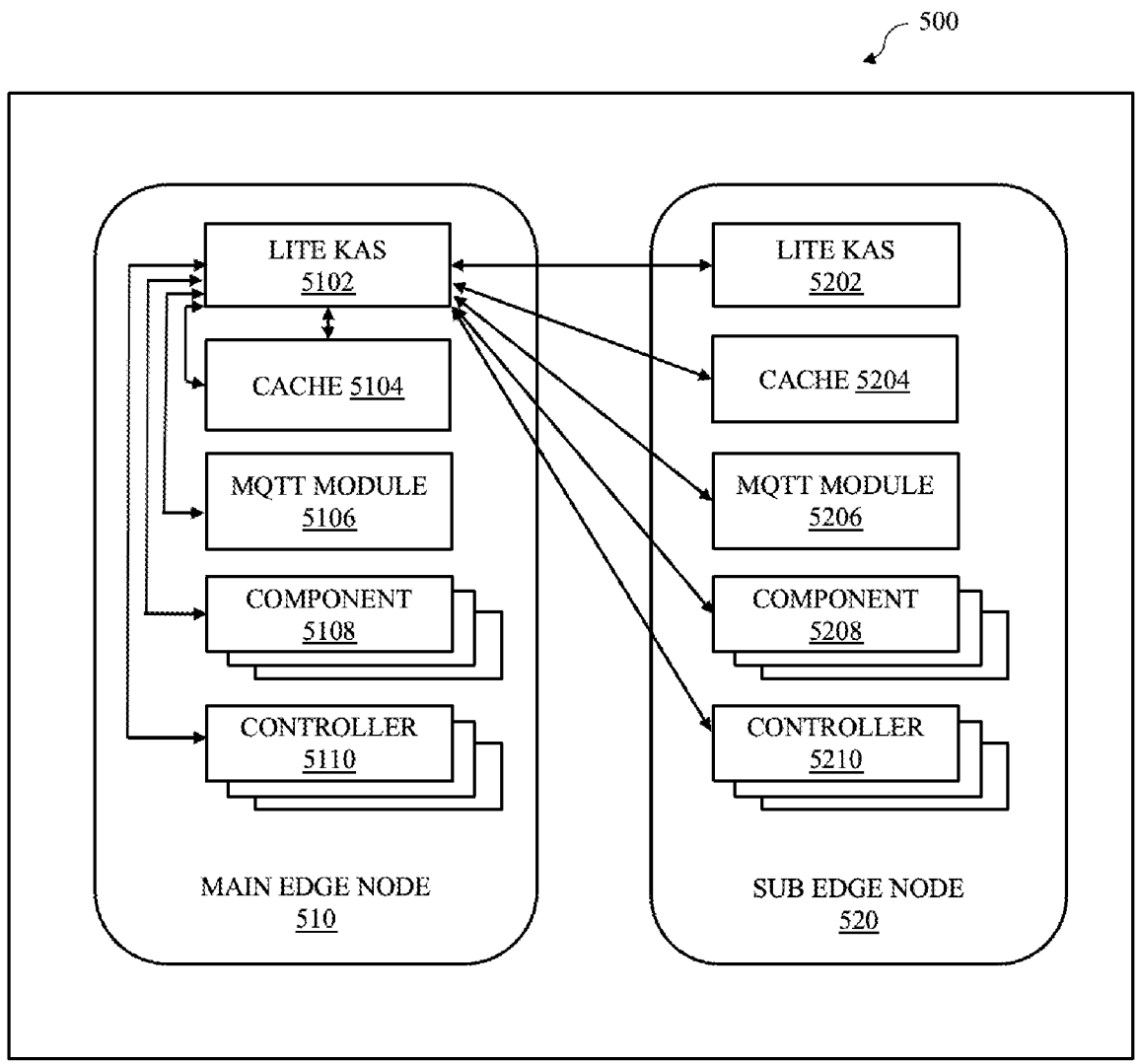
FIG. 5 depicts a schematic block diagram of a federation in a distributed computing framework, in accordance with one embodiment of the present invention.

FIG. 5 depicts a schematic block diagram of a federation 500 in a distributed computing framework according to embodiments of the present disclosure. For example, the federation 500 may be implemented as the federation 420, federation 430, and federation 440 in FIG. 4.

As shown in FIG. 5, the federation 500 comprises a main edge node 510 and one or more sub edge nodes, for example, a sub edge node 520. It can be understood that, the main edge node 510 may be similar as the edge node 422, edge node 432, and edge node 442, and the sub edge node 520 may be similar as the edge node 424, edge node 434, edge node 436, and edge node 444. Thus, repeated descriptions will be omitted.

As shown in FIG. 5, the main edge node 510 may comprise a lite KAS 5102, a cache 5104, a Message Queuing Telemetry Transport (MQTT) module 5106, one or more components (such as, KUBELET, pod) 5108, one or more controllers 5110, and/or the like. The sub edge node 520 may comprise a lite KAS 5202, a cache 5204, a MQTT module 5206, one or more components (such as, KUBELET, pod) 5208, one or more controllers 5210, and/or the like. Arrow lines are shown to present connections between certain means.

In some embodiment, the lite KAS 5102 is a lightweight API server running on the main edge node 510. When a network connection between the central node (for example, the central node 410) and the main edge node is normal (also referred to as a normal scenario), the lite KAS 5102 functions as a proxy for all requests to the central KAS 412 from the components (for example, the component 5108 and the component 5208) running on the edge nodes (the main edge node 510 and the sub edge node 520) in the federation. That is, the sub edge node 520 may also use the lite KAS 5102 as the proxy (for example, by setting its configuration data with configuration data of the lite KAS 5102).

On the other hand, when the network connection is unstable or broken (also referred to as an autonomy scenario), the lite KAS 5102 may become a function limited KAS. Specific details will be described below.

The cache 5104 may comprise an etcd, which is an open source distributed key-value store used to hold and manage the critical information that the distributed computing framework need to keep running. For example, the etcd may store cluster configuration and state data, such as the number of pods, their state, namespace, etc. It may also store the Kubernetes API objects and service discovery details.

In some instances, the cache 5104 may store the data (for example, a response) which is received by the lite KAS 5102 from the central node (for example, the KAS 412) when the network connection is normal. In some embodiments, such data may be used by the lite KAS 5102 for generating response to requests, such as QUERY request, when the network connection is broken.

Moreover, the data stored in the cache 5104 of the main edge node 510 may be synchronized to the cache 5204 of the sub edge node 520. Thus, the sub edge node 520 may potentially be the main edge node. As described above, the role of the edge nodes in the same federation may be switched. For example, if the main edge node 5102 is disconnected to the central node, the lite KAS 5102 may determine whether there is a sub edge node capable of connecting to the central node. If the lite KAS 5102 determines the sub edge node 520 is able to connect to the central node, and all critical information stored in the cache 5104 are synchronized to the cache 5204, the sub edge node 520 may be switched to be the main edge node, while the main edge node 510 may be switched to be the sub edge node. In such case, the lite KAS 5202 may be the new proxy for the edge nodes in the federation 520, such that it can perform the same operations as the lite KAS 5102 originally did, as described above. In some embodiments, the switching of roles may be achieved by amending the configuration data (for example, KUBECONFIG) for each edge node. For example, the IP address of proxy, which is originally pointing to the lite KAS 5102, for each edge node may be reset to the IP address of the lite KAS 5202.

Moreover, the cache 5204 is similar as the cache 5104. Repeated descriptions will be omitted for brevity. The data stored in the cache 5204 may also be synchronized to the cache 5104.

In the main edge node, the Message Queuing Telemetry Transport (MQTT) module 5106 may be implemented with a message queueing telemetry transport protocol. In the autonomy scenario, the lite KAS 5102 may receive a plurality of requests sequentially, for example, from the component 5108 and component 5208. The lite KAS 5102 may push the received requests into the MQTT module 5106 by order. When the network connection restores, the lite KAS 5102 may send the requests in the MQTT module 5102 to the central KAS by order. Thus, it is benefit for maintaining the sequence of the requests.

It can be noted that the MQTT module 5206 of the sub edge node 520 may also be used when the sub edge node 520 is switched to function as the main edge node. Similar description may be omitted herein.

Furthermore, the component 5108 and component 5208 may be the KUBELET or any pod running an application or microservice. The component 5108 (or component 5208)

may send a request, which may be received and/or identified by the lite KAS 5102. The lite KAS 5102 may redirect the request to the KAS 412 (shown in FIG. 4) to obtain a response. The component 5108 (or component 5208) may then receive the response from the lite KAS 5102. In some embodiments, the request may cause a Customer Resource Definition (CRD) in the component 5108 (and/or component 5208) modified.

The controller 5110 (and/or controller 5210) may be also referred to as a customer controller, which may be implemented as a function plug-in. The customer controller may manage a customer resource, for example, update a state of the customer resource to a desired state, and then maintain and change the state by a sequence of operations. The customer resource may be an object described/defined by a Customer Resource Definition (CRD). That is, the customer controller may provide management to the object of the CRD. In some embodiments, the CRDs associated with the controllers deployed in the edge nodes in the federation may be stored/installed in the lite KAS 5102.

Moreover, in the autonomy scenario, the lite KAS 5102 may determine whether the modified CRD (due to a request) in the component is contained in the installed CRDs, so as to determine whether there is a controller capable of processing the request available in the federation. Thus, the request may be processed by the corresponding controller without connecting to the central node, such that a federation autonomy may be implemented. The request may comprise CREATE, DELETE, UPDATE, and/or the like.

Figure 6:
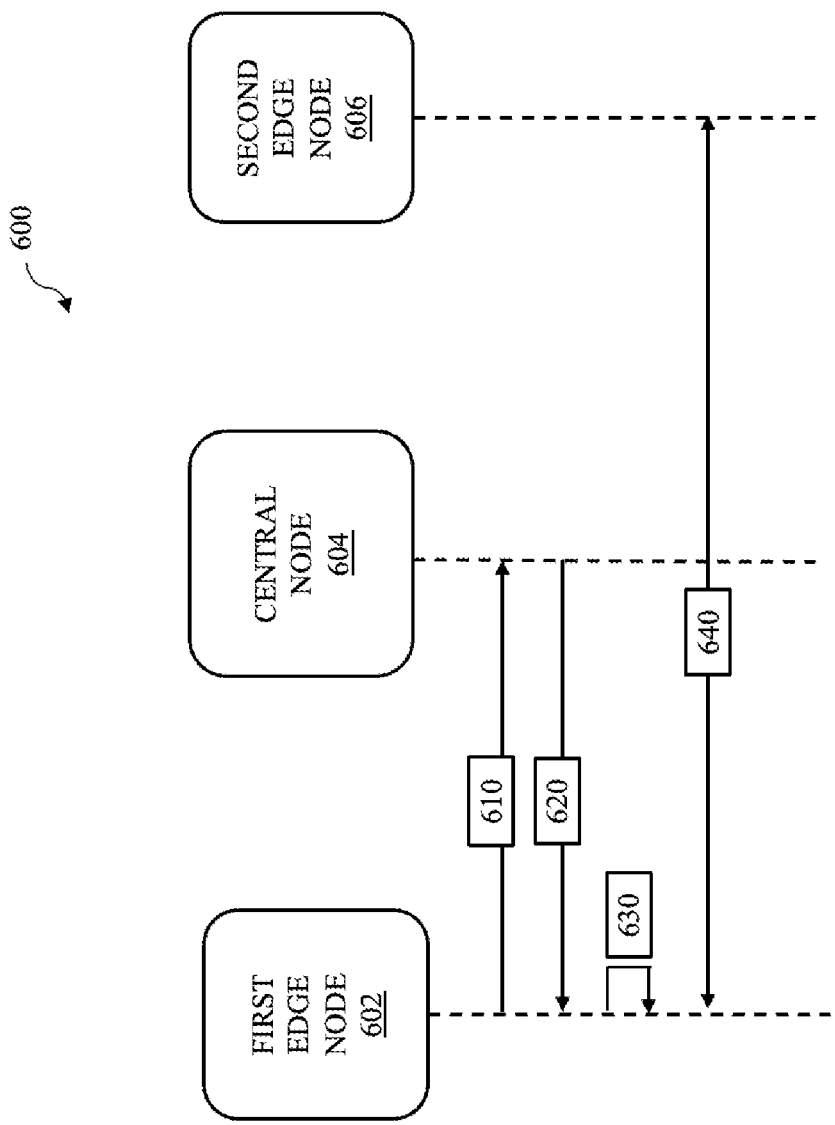
FIG. 6 depicts an illustrative process of an edge node joining into a federation, in accordance with one embodiment of the present invention.

Embodiments of the present disclosure may also provide a method for an edge node joining into a federation according to embodiments of the present disclosure. FIG. 6 depicts an illustrative process 600 of an edge node joining into a federation according to embodiments of the present disclosure.

As shown in FIG. 6, for example, a first edge node 602 may send a joining request to the central KAS (for example, KAS 412 shown in FIG. 4) on the central node 604 (for example, the central node 410 shown in FIG. 4) at operation 610. The central KAS on the central node 604 may send a list of existed edge nodes (i.e., the main edge nodes, for example, the main edge node 510 shown in FIG. 5) connected to the central node 604 and an IP addresses of the corresponding lite KAS (for example, the lite KAS 5102 shown in FIG. 5), to the first edge node 602 at operation 620. Accordingly, the first edge node 602 may receive the list from the central node 604.

At operation 630, the first edge node 602 may choose one edge node (i.e., the second edge node 606 (for example, the main edge node 510 shown in FIG. 5) from the list by some strategy, for example, based on region, zone, user preference, and/or the like, so as to join the federation comprising the second edge node 606. In this case, the first edge node 602 may reset its configuration data with the IP address of the lite KAS of the second edge node 606. Therefore, the lite KAS of the second edge node 606 may function as the proxy for the first edge node 602. As a result, the first edge node 602 joins into the federation in which the second edge node 606 is the main edge node. It can be understood that, the first edge node 602 may become the sub edge node in the federation.

Thus, the first edge node 602 may connect to the second edge node 606 at operation 640. In this situation, the first edge node 602 and the second edge node 606 may share data.

It can be appreciated that, the above process may also be implemented for establishing a federation. For example, in a case that the second edge node 606 is individually connected to the central node 604 without being federated with other edge nodes, a federation may be established to include both the first edge node 602 and the second edge node 606, after that the first edge node 602 resets its IP address of proxy to an IP address of a lite KAS of the second edge node 606.

Moreover, after the first edge node 602 joined, the second edge node 606 may determine/identify the controllers deployed in the first edge node 602, for example, by detecting list/watch links. Each of the controllers may manage a customer resource, and may then be associated with a customer resource definition of the corresponding customer resource (i.e., CRD). In some embodiments, the second edge node 606 (for example, the lite KAS thereof) may install the CRDs related to the controllers. The installed CRDs may then be used for determining whether the federation autonomy may be implemented successfully. Detailed processes will be described below.

Furthermore, after the first edge node 602 joined the federation, data stored on the second edge node 606 may be synchronized to the first edge node 602, such that, the first edge node 602 may potentially become the main edge node to replace the second edge node 606 in certain circumstances.

As described above, the network connection between the main edge node and the central node may be unstable, or even broken. Embodiments of the present disclosure further provides a method for autonomy of edge nodes in the federation.

Figure 7:
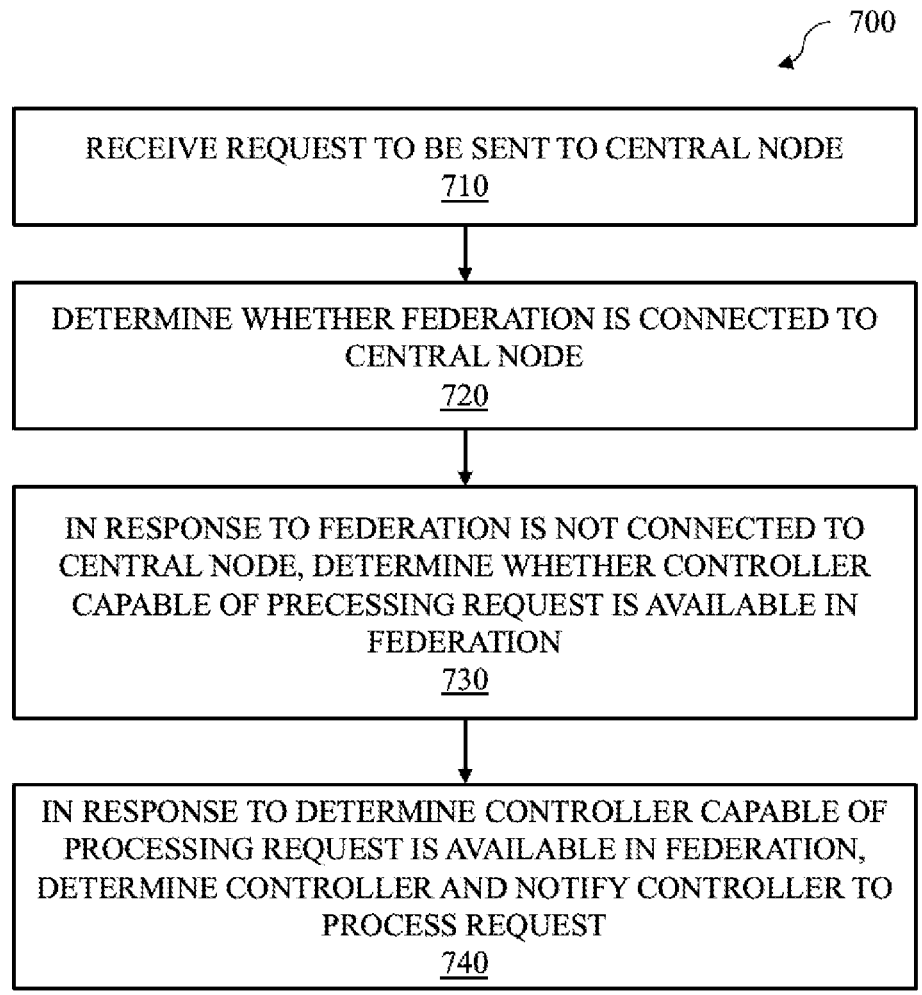
FIG. 7 depicts an illustrative flowchart diagram of a method for edge node autonomy, in accordance with one embodiment of the present invention.

FIG. 7 depicts an illustrative flowchart diagram of a method 700 for autonomy of edge nodes in a federation (for example, the federation 420, federation 430, federation 440, or federation 500, shown in FIG. 4 and FIG. 5) in a distributed computing framework (for example, the distributed computing framework 400 shown in FIG. 4) according to embodiments of the present disclosure.

In some embodiments, the method 700 may be implemented by a computing device, for example, the computer system/server 12 shown in FIG. 1. Specifically, the method 700 may be implemented by a lite API server (for example, the KAS 5102 shown in FIG. 5) of a master edge node (for example, the main edge node 510 shown in FIG. 5).

At step 710, the lite KAS of the main edge node (referred to as a main lite KAS hereinafter) receives a request to be sent to the central node.

In some embodiments, the request may be sent, for example, from a component on one of the edge nodes (i.e., the main edge node and the sub edge nodes) in the federation. In some embodiments, the request may be related to a function, such as, GET, CREATE, UPDATE, DELETE, and/or the like.

At step 720, the main lite KAS determines whether the federation is connected to the central node.

In some embodiments, the main lite KAS may determine whether the main edge node is connected to the central node. In response to a connection between the main edge node and the central edge node (such situation may also be referred to as a normal scenario), the main lite KAS may determine the federation is connected to the central node. In such cases, the main lite KAS may send the request to the central node and receive a response from the central node accordingly. Further, the main lite KAS may send the response back to the component sending the request at step 710.

Specifically, in the normal scenario, the main lite KAS may function as a proxy for redirecting the request from the component on the edge nodes to the KAS on the central node, and return the response to the component. Therefore, an application or microservice may operate in the component (for example, a container in a pod) according to the response. Moreover, the main lite KAS may cache the response, which may then be used for a future request (for example, a QUERY request, such as a GET function) when the connection is broken (i.e., in an autonomy scenario).

In some other embodiments, if the main lite KAS determines that the main edge node is disconnected to the central node, it can further determine whether there are one or more other edge nodes (sub edge nodes) capable of connecting to the central node in the federation. If so, the main lite KAS may cause one of the one or more edge nodes capable of connecting to the central node to connect to the central node. Therefore, the main lite KAS may further determine that the federation is still connected to the central node. In some embodiments, the sub edge node caused to connect to the central node may be selected by the main lite KAS based on certain rules, for example, a network signal strength. Accordingly, such sub edge node may become the main edge node, while the original main edge node may become the sub edge node in the federation. In this way, the federation may still connect to the central node via the new main edge node, and the normal scenario may maintain.

Moreover, data stored in the original main edge node may be synchronized to the sub edge nodes in advance, typically when the sub edge node is caused to connect to the central node.

On the other hand, if the main edge node determines that there is no edge node capable of connecting to the central node, it may determine that the federation is disconnected to the central node. Thus, an autonomy scenario may occur. That is, only if none of the edge nodes in the federation could be connected to the central node, the federation enters the autonomy scenario.

At step 730, in response to determining the federation is disconnected to the central node, the lite KAS determines whether a controller capable of processing the request is available in the federation.

In some embodiments, the main lite KAS may identify a customer resource definition which is modified according to the request. Specifically, the etcd stored in the cache of the main edge node may be changed when the CRD is modified in the component. As described above, a plurality of CRDs, each associated with a controller in the federation, may be installed in the main lite KAS. Thus, the main lite KAS may determine whether the identified customer resource definition is contained in the installed customer resource definitions.

In response to determining that the identified customer resource definition is contained in the installed customer resource definitions, the main lite KAS may determine the controller is available in the federation. In some embodiments, the controller capable of processing the request is the controller associated with the identified customer resource definition.

At step 740, in response to determining the controller capable of processing the request is available in the federation, the main lite KAS determines the controller and notifies the controller to process the request.

In some embodiments, the controller may be determined based on the identified customer resource definition. For example, the main lite KAS may determine a controller associated with the first customer resource definition as the controller capable of processing the request.

Otherwise, if the identified customer resource definition is not contained in the installed customer resource definitions, the main lite KAS may determine the controller capable of processing the request is not available in the federation.

In some further embodiments, the main lite KAS may receive the response from the controller, and send the response to the components. Thus, the application/service may be running in the component based on the response.

Moreover, the request processed by the controller may be a function of CREATE, DELETE, UPDATE, and/or the like. If the request is a query request (GET), the main lite KAS may handle the request based on data stored in the cache of the edge node (for example, the main edge node), in the autonomy scenario.

In further embodiments, a plurality of requests may be received during the autonomy scenario. The main lite KAS may push the requests into a MQTT module in the main edge node, for example, besides the query requests, in sequence. Thus, all of the requests (except the query requests) received by the lite KAS in the autonomy scenario may be recorded in the MQTT module.

Furthermore, after the federation and the central node are reconnected, the main lite KAS may send the requests in the MQTT module to the central node (for example, the KAS) by order.

Normally, when the connection restores, the KAS on the central node may notify the federation (typically, the main edge node) to change state of objects to maintain state consistence. However, as the etcd is already modified during the autonomy scenario based on the request, there is no need to perform the notification. Thus, the main lite KAS may block such notifications, and thus not notify the etcd to change for the requests processed in the autonomy scenario, thereby avoiding duplicating.

Figure 8:
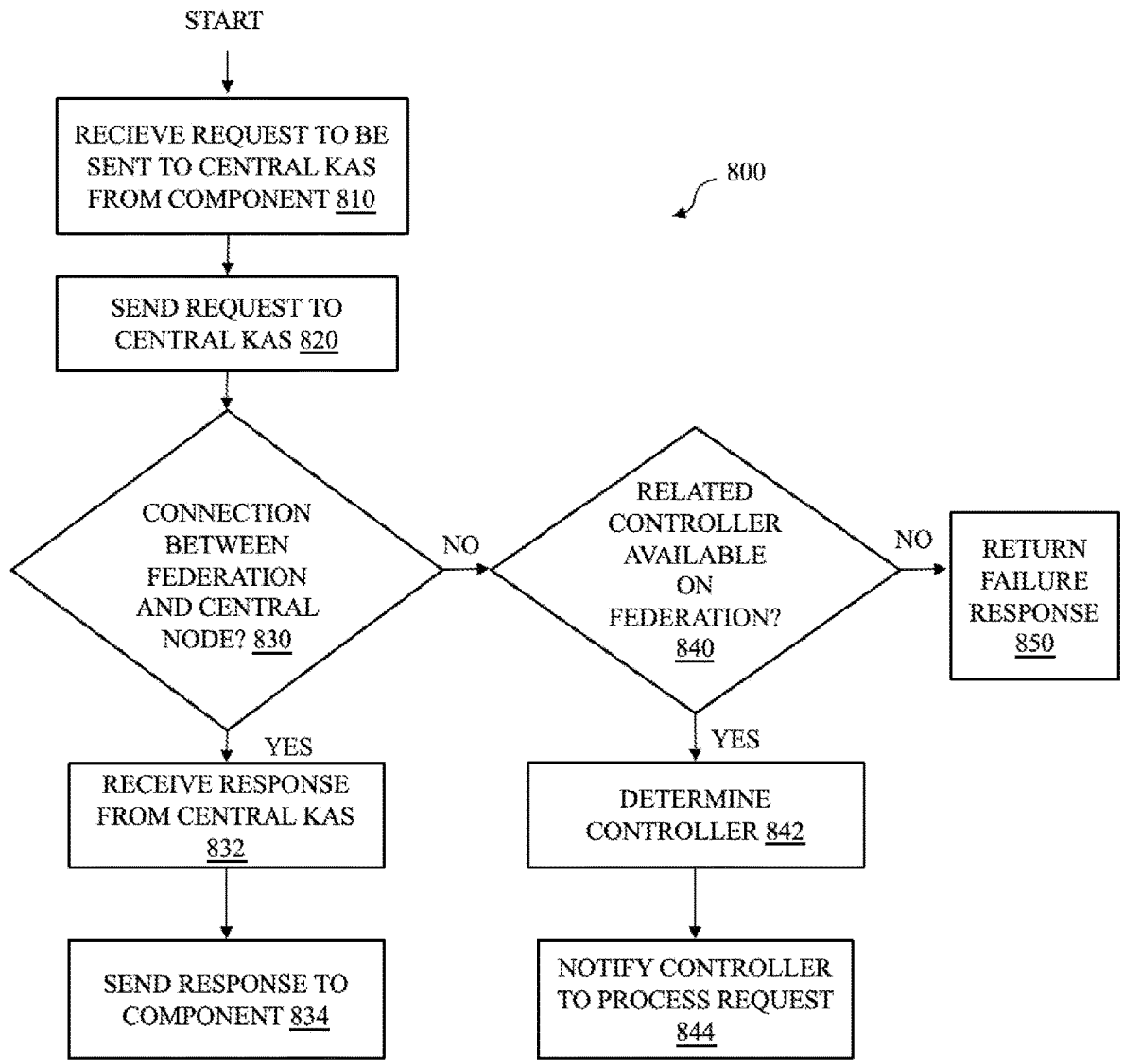
FIG. 8 depicts an illustrative process for edge node autonomy, in accordance with one embodiment of the present invention.

Now, description will be provided with respect to a process 800 in a federation (such as the federation 500 shown in FIG. 5) in a distributed computing framework (such as the distributed computing framework 400 shown in FIG. 4) as shown in FIG. 8. The process 800 may be implemented by a lite KAS (such as the lite KAS 5102 shown in FIG. 5, and also referred to as a main lite KAS) of a main edge node in a federation. In some embodiments, the process 800 may be performed to realize the method in FIG. 7.

In some embodiments, the main lite KAS listens to ports of components on edge nodes in the federation. Thus, a request from one of the components in the federation may be passed to the main lite KAS. At step 810, the main lite KAS receives the request to be sent to the KAS on the central node (referred to as the central KAS) from one of the components in the federation. At step 820, the main lite KAS sends the request to the central KAS.

The main lite KAS determines whether the federation is connected to the central node, at step 830. If so, the central KAS returns a corresponding response to the main lite KAS. Thus, the process continues at step 832, where the main lite KAS receives the response from the central KAS. At step 834, the main lite KAS sends the response to the component sending the request. Thus, the component runs the application or microservice based on the response normally.

On the other hand, if the federation is disconnected from the central node, the process continues at step 840, where the main lite KAS determines whether related controller is available in the federation. Specific determination process may be implemented based on the above description with respect to FIG. 7. If the related controller is available in the federation, at step 842, the main lite KAS determines the controller capable of processing the request. At step 844, the main lite KAS notifies the controller to process the request. Accordingly, the determined controller processes the request with related logics.

If the related controller is not available in the federation, the request is failed. The main lite KAS returns a failure response to the component sending the request, at step 850.

Figure 9:
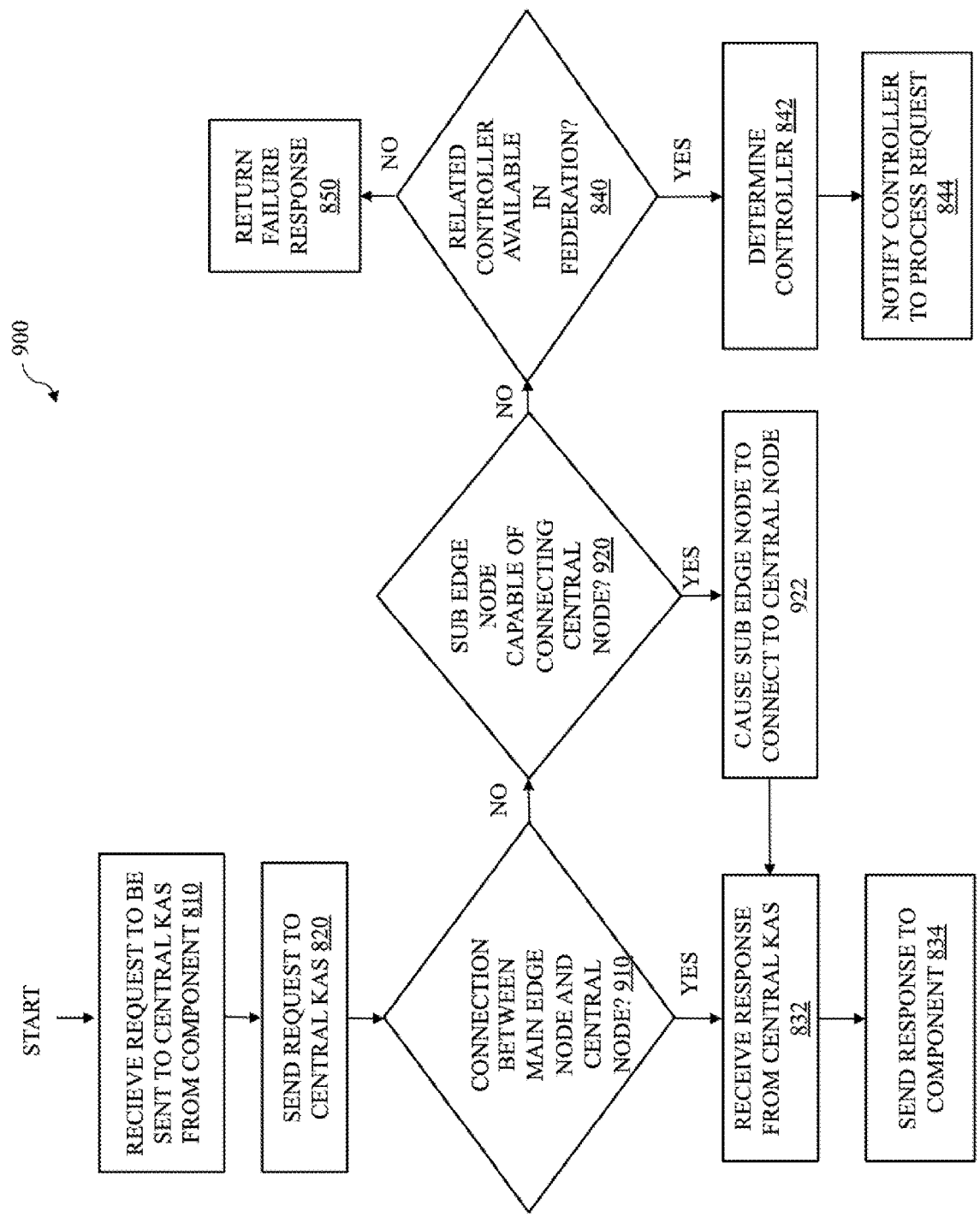
FIG. 9 depicts an illustrative process for edge node autonomy, in accordance with one embodiment of the present invention.

Further, in order to improve robustness of the federation, embodiments also provide another process 900 in a federation (such as the federation 500 shown in FIG. 5) in a distributed computing framework (such as the distributed computing framework 400 shown in FIG. 4) as shown in FIG. 9. The process 900 may be implemented by a lite KAS (such as the lite KAS 5102 shown in FIG. 5, and also referred to as a main lite KAS) of a main edge node in a federation. In some embodiments, the process 900 may be performed to realize the method in FIG. 7.

It can be noted that the process 900 is similar with the process 800 shown in FIG. 8. Like number denotes like step. Thus, description will be given for only the different parts.

After processing the step 820, at step 910, the main lite KAS determines whether the main edge node is connected to the central node. If yes, the process 900 continues at step 832.

Otherwise, if the main edge node is disconnected from the central node, the process continues at step 920, where the main lite KAS determines whether there is another edge node (sub edge node) in the federation capable of connecting to the central node. If so, at step 922, the main lite KAS causes such sub edge node to connect to the central node, such that the sub edge node may become the main edge node of the federation while the original main edge node may become the sub edge node. Accordingly, the federation may be still connected to the central node, the process may be continued at step 832.

Moreover, if none of the edge nodes is capable of connecting to the central node, the process goes to step 840. Descriptions for similar operations may be omitted herein for brevity.

According to embodiments of the present disclosure, a federation autonomy method may be provided. The federated edge nodes may provide abundant resources, which may improve stableness and robustness of the federation. It is especially benefit to the requests with value changing, such as CREATE, DELETE, UPDATE, and/or the like. Moreover, as the MQTT module is implemented, the sequences of the requests sent during the autonomy scenario may be maintained after the connection is restored.

Additionally, in some embodiments of the present disclosure, an apparatus for autonomy of edge nodes may be provided in a distributed computing framework comprising a central node and a plurality of federations. Each of the federations may comprise a plurality of edge nodes. The apparatus may be arranged in a main edge node of plurality of edge nodes and comprise one or more processors, a memory coupled to at least one of the one or more processors, and a set of computer program instructions stored in the memory. The set of computer program instructions may be executed by at least one of one or more processors to perform the above method.

In some other embodiments of the present disclosure, a computer program product for autonomy of edge nodes may be provided in a distributed computing framework comprising a central node and a plurality of federations. Each of the federations may comprise a plurality of edge nodes. The computer program product may be arranged in a main edge node of the plurality of edge nodes and comprise a computer readable storage medium having program instructions embodied therewith. The program instructions executable by one or more processors causes the processor to perform the above method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for edge node autonomy, the method comprising:
    for a first edge node of a plurality of edge nodes in a federation in a distributed computing framework, receiving, by one or more processors, a request to be sent to a central node in the distributed computing framework;
    determining, by the one or more processors, whether the federation is connected to the central node;
    in response to determining that the federation is not connected to the central node, determining, by the one or more processors, whether a controller capable of processing the request is available in the federation;
    in response to determining that the controller capable of processing the request is available in the federation, notifying, by the one or more processors, the controller to process the request; and
    wherein the first edge node comprises a message queuing telemetry transport (MQTT) module, the method further comprising:
        during a disconnection period in which the federation is not connected to the central node, receiving, by the one or more processors, a plurality of requests in sequence; and
        pushing, by the one or more processors, the plurality of the requests into the MQTT module in sequence.

2. The computer-implemented method of claim 1, wherein a plurality of customer resource definitions are installed in the first edge node, each of the plurality of controller resource definitions is associated with a controller arranged in the federation, and wherein determining whether the controller capable of processing the request is available in the federation comprises:
    identifying, by the one or more processors, a controller resource definition which is modified according to the request;
    determining, by the one or more processors, whether the controller resource definition is contained in the plurality of the customer resource definitions; and
    in response to determining that the controller resource definition is contained in the plurality of the customer resource definitions, determining, by the one or more processors, that the controller capable of processing the request is available in the federation.

3. The computer-implemented method of claim 2, wherein determining the controller in the federation comprises:
    determining, by the one or more processors, a controller associated with the controller resource definition as the controller capable of processing the request.

4. The computer-implemented method of claim 1, further comprising:
    in response to a reconnection between the federation and the central node after the disconnection period, sending, by the one or more processors, the plurality of the requests in the MQTT module to the central node in sequence.

5. The computer-implemented method of claim 1, further comprising:
in response to determining that the controller capable of processing the request is not available in the federation, sending, by the one or more processors, a failure response to the request.

6. The computer-implemented method of claim 1, wherein the first edge node is connected to the central node via a network connection, and each of other edge nodes in the federation is configured with configuration data of the first edge node.

7. The computer-implemented method of claim 6, wherein a second edge node is joined into the federation by:
sending, by the one or more processors, a joining request to the central node;
receiving from the central node, by the one or more processors, a list of edge nodes connected to the central node;
selecting, by the one or more processors, one of the edge nodes from the list; and
resetting, by the one or more processors, configuration data with configuration data of the one of the edge nodes, such that the second edge node is joined into the federation comprising the one of the edge nodes.

8. The computer-implemented method of claim 1, wherein determining whether the federation is connected to the central node comprises:
determining, by the one or more processors, whether the first edge node is connected to the central node;
in response to determining that the first edge node is not connected to the central node, determining, by the one or more processors, whether there are one or more edge nodes capable of connecting to the central node in the federation; and
in response to determining that there are the one or more edge nodes capable of connecting to the central node in the federation, causing, by the one or more processors, one of the one or more edge nodes to connect to the central node such that the federation is connected to the central node.

9. The computer-implemented method of claim 8, wherein data stored in the first edge node are synchronized to the one of the one or more edge nodes.

10. The computer-implemented method of claim 1, further comprising:
in response to determining that the federation is connected to the central node, sending, by the one or more processors, the request to the central node.

11. An apparatus for edge node autonomy, the apparatus comprising one or more processors, one or more computer readable tangible storage devices, and program instructions stored on at least one of the one or more computer readable tangible storage devices for execution by at least one of the one or more processors, the program instructions executable to:
for a first edge node of a plurality of edge nodes in a federation in a distributed computing framework, receive a request to be sent to a central node in the distributed computing framework;
determine whether the federation is connected to the central node;
in response to determining that the federation is not connected to the central node, determine, whether a controller capable of processing the request is available in the federation;
in response to determining that the controller capable of processing the request is available in the federation, notify the controller to process the request; and
wherein the first edge node comprises a message queuing telemetry transport (MQTT) module, the program instructions further executable to:
during a disconnection period in which the federation is not connected to the central node, receive a plurality of requests in sequence;
push the plurality of the requests into the MQTT module in sequence; and
in response to a reconnection between the federation and the central node after the disconnection period, send the plurality of the requests in the MQTT module to the central node in sequence.

12. The apparatus of claim 11, wherein a plurality of customer resource definitions are installed in the first edge node, each of the plurality of controller resource definitions is associated with a controller arranged in the federation, and wherein the program instructions for determining whether the controller capable of processing the request is available in the federation are further executable to:
identify a controller resource definition which is modified according to the request;
determine whether the controller resource definition is contained in the plurality of the customer resource definitions; and
in response to determining that the controller resource definition is contained in the plurality of the customer resource definitions, determine that the controller capable of processing the request is available in the federation.

13. The apparatus of claim 12, wherein the program instructions for determining the controller in the federation are further executable to:
determine a controller associated with the controller resource definition as the controller capable of processing the request.

14. The apparatus of claim 11, the program instructions further executable to:
in response to determining that the controller capable of processing the request is not available in the federation, send a failure response to the request.

15. The apparatus of claim 11, wherein the program instructions for determining whether the federation is connected to the central node are further executable to:
determine whether the first edge node is connected to the central node;
in response to determining that the first edge node is not connected to the central node, determine whether there are one or more edge nodes capable of connecting to the central node in the federation; and
in response to determining that there are the one or more edge nodes capable of connecting to the central node in the federation, cause one of the one or more edge nodes to connect to the central node such that the federation is connected to the central node.

16. The apparatus of claim 11, the program instructions further executable to:
in response to a reconnection between the federation and the central node after the disconnection period, send the plurality of the requests in the MQTT module to the central node in sequence.

17. A computer program product for edge node autonomy, the computer program product comprising a computer readable storage medium having program instructions embodied therewith, the program instructions executable by one or more processors, the program instructions executable to:
- for a first edge node of a plurality of edge nodes in a federation in a distributed computing framework, receive a request to be sent to a central node in the distributed computing framework;
- determine whether the federation is connected to the central node;
- in response to determining that the federation is not connected to the central node, determine whether a controller capable of processing the request is available in the federation;
- in response to determining that the controller capable of processing the request is available in the federation, notify the controller to process the request; and
- wherein the first edge node comprises a message queuing telemetry transport (MQTT) module, the program instructions further executable to:
  - during a disconnection period in which the federation is not connected to the central node, receive a plurality of requests in sequence;
  - push the plurality of the requests into the MQTT module in sequence; and
  - in response to a reconnection between the federation and the central node after the disconnection period, send the plurality of the requests in the MQTT module to the central node in sequence.

18. The computer program product of claim 17, wherein a plurality of customer resource definitions are installed in the first edge node, each of the plurality of controller resource definitions is associated with a controller arranged in the federation, and wherein the program instructions for determining whether the controller capable of processing the request is available in the federation are further executable to:
- identify a controller resource definition which is modified according to the request;
- determine whether the controller resource definition is contained in the plurality of the customer resource definitions;
- in response to determining that the controller resource definition is contained in the plurality of the customer resource definitions, determine that the controller capable of processing the request is available in the federation.

19. The computer program product of claim 17, wherein the program instructions for determining whether the federation is connected to the central node are further executable to:
- determine whether the first edge node is connected to the central node;
- in response to determining that the first edge node is not connected to the central node, determine whether there are one or more edge nodes capable of connecting to the central node in the federation; and
- in response to determining that there are the one or more edge nodes capable of connecting to the central node in the federation, cause one of the one or more edge nodes to connect to the central node such that the federation is connected to the central node.

20. The computer program product of claim 17, the program instructions further executable to:
- in response to a reconnection between the federation and the central node after the disconnection period, send the plurality of the requests in the MQTT module to the central node in sequence.

\* \* \* \* \*